US010959160B2

(12) United States Patent
Lou et al.

(10) Patent No.: US 10,959,160 B2
(45) Date of Patent: Mar. 23, 2021

(54) METHOD AND APPARATUS FOR NETWORK SLICE CONFIGURATION

(71) Applicant: HUAWEI TECHNOLOGIES CO., LTD., Guangdong (CN)

(72) Inventors: Chong Lou, Shanghai (CN); Qinghai Zeng, Shanghai (CN); Jian Zhang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/274,827

(22) Filed: Feb. 13, 2019

(65) Prior Publication Data
US 2019/0182752 A1 Jun. 13, 2019

Related U.S. Application Data

(63) Continuation of application No. PCT/CN2017/097533, filed on Aug. 15, 2017.

(30) Foreign Application Priority Data

Aug. 15, 2016 (CN) .......................... 201610671376.4

(51) Int. Cl.
H04W 48/08 (2009.01)
H04W 28/02 (2009.01)
(Continued)

(52) U.S. Cl.
CPC ............. H04W 48/08 (2013.01); H04W 8/22 (2013.01); H04W 24/02 (2013.01);
(Continued)

(58) Field of Classification Search
CPC ....... H04W 24/02; H04W 8/22; H04W 48/06; H04W 48/08; H04W 28/0289; H04W 28/0268; H04W 84/00
See application file for complete search history.

(56) References Cited

U.S. PATENT DOCUMENTS

2013/0329629 A1 12/2013 Bao
2014/0198768 A1 7/2014 Hahn et al.
(Continued)

FOREIGN PATENT DOCUMENTS

CN 102098723 A 6/2011
CN 105247946 A 1/2016
CN 105637809 A 6/2016

OTHER PUBLICATIONS

3GPP TR 22.891 V14.0.0 (Mar. 2016), 3rd Generation Partnership Project; Technical Specification Group Services and System Aspects; Feasibility Study on New Services and Markets Technology Enablers; Stage 1 (Release 14), Mar. 2016, 95 pages.
(Continued)

Primary Examiner — Brian D Nguyen
(74) Attorney, Agent, or Firm — Fish & Richardson P.C.

(57) ABSTRACT

The present disclosure relates to network slice configuration methods and apparatus. One example method includes determining, by a first network device, network slice configuration information, and sending, by the first network device, the network slice configuration information to a second network device, where the network slice configuration information instructs the second network device to perform network slice configuration based on the network slice configuration information.

15 Claims, 6 Drawing Sheets

(51) Int. Cl.
  *H04W 48/06* (2009.01)
  *H04W 8/22* (2009.01)
  *H04W 24/02* (2009.01)
  *H04W 84/00* (2009.01)

(52) U.S. Cl.
  CPC ... *H04W 28/0268* (2013.01); *H04W 28/0289* (2013.01); *H04W 48/06* (2013.01); *H04W 84/00* (2013.01)

(56) References Cited

U.S. PATENT DOCUMENTS

| | | | |
|---|---|---|---|
| 2014/0298303 A1* | 10/2014 | Kanada | G06F 8/41 717/140 |
| 2016/0094351 A1 | 3/2016 | Rune et al. | |
| 2016/0249353 A1 | 8/2016 | Nakata et al. | |
| 2017/0054595 A1* | 2/2017 | Zhang | H04L 41/0896 |
| 2017/0079059 A1* | 3/2017 | Li | H04W 16/02 |
| 2017/0086118 A1* | 3/2017 | Vrzic | H04W 36/26 |
| 2018/0124660 A1* | 5/2018 | Zhang | H04W 84/02 |
| 2018/0212845 A1* | 7/2018 | Eriksson | H04W 28/18 |
| 2019/0141760 A1* | 5/2019 | Stille | H04W 76/12 |
| 2019/0174498 A1* | 6/2019 | Samdanis | H04W 72/0453 |

OTHER PUBLICATIONS

3GPP TR 23.799 V0.4.0 (Apr. 2016), 3rd Generation Partnership Project; Technical Specification Group Services and System Aspects; Study on Architecture for Next Generation System (Release 14), Apr. 2016, 96 pages.

Partial Supplementary European Search Report issued in European Application No. 17841046.0 dated Apr. 11, 2019, 17 pages.

PCT International Search Report and Written Opinion issued in International Application No. PCT/CN2017/097533 dated Nov. 10, 2017, 15 pages (with English translation).

R3-161011, Nokia et al., "TP for Key principles for Support of Network Slicing in RAN," 3GPP TSG-RAN WG3 Meeting #91bis, Bangalore, India, Apr. 11-15, 2016, 2 pages.

R3-161134, Huawei, "Network slice selection," RAN WG3 Meeting #92 Nanjing, China, May 23-27, 2016, 4 pages.

R3-161759, Huawei, "RAN Support for Core Network Slicing," RAN WG3 Meeting #93, RAN WG3, 3GPP Draft; Gothenburg, Sweden; Aug. 22-26, 2016, XP051142877, 14 pages.

S2-161503, Huawei et al., "Update of Solution #1 for Key issue #1," 3GPP SA WG2 Meeting #114, SA WG2, 3GPP Draft; Sophia Antipolis, France; Apr. 11-15, 2016, XP051086496, 4 pages.

S2-162981, Huawei et al., "UE Slice Association/Overload control Procedure", 3GPP TSG SA WG2 Meeting #115, SA WG2, GPP Draft; Nanjing, China, May 23-27, 2016, XP051116481, 8 pages.

S2-164139, China Mobile et al., "Network slicing selection solution based on Slice Instance ID," SA WG2 Meeting #116, SA WG2, 3GPP Draft; Vienna, Austria, Jul. 11-15, 2016, XP051123042, 6 pages.

EPO Communication pursuant to Article 94(3) EPC issued in European Application No. 17841046.0 dated Jan. 20, 2021, 11 pages.

Ericsson, "RAN support for network slicing," 3GPP TSG-RAN WG2 #95, Tdoc R2-165542, Gothenburg, Sweden, Aug. 22-26, 2016, 4 pages.

LG Electronics, "New Key Issue: Congestion and access control for Next Generation Network Architecture," SA WG2 Meeting #116, S2-164257, Vienna, Austria, Jul. 11-15, 2016, 5 pages.

* cited by examiner

METHOD AND APPARATUS FOR NETWORK SLICE CONFIGURATION

CROSS-REFERENCE TO RELATED APPLICATIONS

This application is a continuation of International Application No. PCT/CN2017/097533, filed on Aug. 15, 2017, which claims priority to Chinese Patent Application No. 201610671376.4, filed on Aug. 15, 2016. The disclosures of the aforementioned applications are hereby incorporated by reference in their entireties.

TECHNICAL FIELD

This application relates to the field of communications technologies, and in particular, to a method and apparatus for network slice configuration.

BACKGROUND

A future fifth generation (the fifth generation, 5G) mobile communications network can support more diversified service types and user requirements. Dramatic upgrade is to be achieved in aspects including speed, capacity, security, reliability, availability, latency, energy consumption, and the like. Compared with an existing 4th generation mobile communications network, the 5G network needs to meet more requirements: Network traffic is to grow by thousands of times, a quantity of to-be-connected devices grows by at least a hundred times as compared with a current quantity of to-be-connected devices, and some services require an extremely low delay. The 5G network provides a "network customization" service to address diversification of future services. A network architecture is to become more flexible, and an operator can flexibly combine key performance indicators (key performance indicator, KPI) such as speed, capacity, coverage, and reliability, so that the network architecture can meet a requirement in each specific use case.

In a conventional mobile communications system, a vertical architecture is used with ranging from physical resources to protocol support, to meet a predictable KPI requirement. The vertical architecture is applicable to a user network of a single service type. However, it is difficult for the vertical architecture to perform adaptive adjustment based on a flexible user requirement and meet a requirement of a new type of use case. Therefore, the 3rd Generation Partnership Project (3rd Generation Partnership Project, 3GPP) presents a concept of network slicing (Network slicing) in a 5G network architecture. Network slicing is a combination of logical network functions to meet a communications service requirement in a specific use case. In network slicing, a logical resource instead of a physical resource is used, to help the operator provide a service-based network architecture. In such a network service, a resource and a requirement are allocated and reallocated, scalability of an independent network function module and flexible deployment of physical and virtual functions are allowed, a network resource is fully and efficiently utilized, and a service performance requirement is met.

Much technological implementation about network slicing in 3GPP is still under discussion. Currently, only the concept of network slicing and a potential network slice architecture are provided, and there is still no definite solution for how to perceive a network slice configuration process on a radio access network (radio access network, RAN) side.

SUMMARY

Embodiments of this application provide a network slice configuration method and apparatus, to perceive a network slice configuration process on a radio access network side.

According to a first aspect, an embodiment of this application provides a network slice configuration method, including:

determining, by a first network device, network slice configuration information; and sending, by the first network device, the network slice configuration information to a second network device, to instruct the second network device to perform network slice configuration based on the network slice configuration information.

According to the method provided in this embodiment of this application, after determining the network slice configuration information, the first network device sends the network slice configuration information to the second network device, so that the second network device may perform the network slice configuration based on the network slice configuration information. In this way, a network slice configuration process is perceived on a radio access network side.

Optionally, the first network device is a core-network network element, and the second network device is an access-network network element; and the determining, by a first network device, network slice configuration information includes:

determining, by the first network device, the network slice configuration information based on a received network slice configuration message sent by a third network device, where the third network device is an operation, administration, and management network element.

Optionally, the first network device is a core-network network element, and the second network device is an access-network network element; and before the determining, by a first network device, network slice configuration information, the method further includes:

receiving, by the first network device, a network slice configuration request message sent by the second network device, where the network slice configuration request message is used to request the first network device to send the network slice configuration information, the network slice configuration request message is sent after the second network device receives a request message sent by a fourth network device, and the fourth network device is a terminal or a target core-network network element.

Optionally, the first network device is a core-network network element or an operation, administration, and management network element, and the second network device is an access-network network element; and before the determining, by a first network device, network slice configuration information, the method further includes:

receiving, by the first network device, capability information of the second network device that is sent by the second network device; and the determining, by a first network device, network slice configuration information includes:

determining, by the first network device, the network slice configuration information based on the capability information of the second network device.

Optionally, the capability information of the second network device includes any one or more of the following information:

identification information of the second network device;
version information of the second network device;

antenna resource information of the second network device;
bandwidth resource information of the second network device;
load information of the second network device;
architecture resource information of the second network device; and
user information of the second network device.

Optionally, the first network device is a core-network network element or an operation, administration, and management network element, and the second network device is an access-network network element; and after the sending, by the first network device, the network slice configuration information to a second network device, the method further includes:

sending, by the first network device, a network slice management message to the second network device, to instruct the second network device to manage, based on the network slice management message, the network slice configuration information in the second network device.

Optionally, the network slice management message includes any one or more of the following information:
a network slice activation command;
a network slice deactivation command;
a network slice enabling command;
a network slice disabling command;
network slice reconfiguration information; and
a network slice identifier.

Optionally, after the sending, by the first network device, the network slice configuration information to a second network device, the method further includes:

receiving, by the first network device, a response message sent by the second network device, where the response message is used to indicate that the second network device refuses to accept the network slice configuration information, and the response message includes a refusal reason.

Optionally, the network slice configuration information includes any one or more of the following information:
network slice user information;
network slice service management information;
network slice attribute information; and
network slice resource control information.

Optionally, the network slice user information includes any one or more of the following parameters:
network slice identification information;
mobile operator information; and
user information.

Optionally, the network slice service management information includes any one or more of the following parameters:
network slice identification information;
a quality of service QoS parameter of each terminal;
a QoS parameter of each network slice;
aggregate QoS information of N network slices to which M terminals belong, where M is a natural number and N is a natural number;
aggregate QoS information of K network slices, where K is a natural number;
network slice priority information; and
congestion control information.

Optionally, the network slice attribute information includes any one or more of the following parameters:
network slice identification information;
network slice routing information;
network slice service area information;
network slice target user information;
network slice coverage information;
network slice capacity and bandwidth information; and
network slice service time period information.

Optionally, the network slice resource control information includes any one or more of the following parameters:
network slice identification information;
a network slice resource isolation requirement;
a network slice designation or preference requirement;
network slice topology information;
a network slice architecture requirement;
network slice resource configuration;
network slice protocol stack configuration;
network slice algorithm configuration; and
parameter configuration of each function module in a network slice.

Optionally, the aggregate QoS information of the N network slices to which the M terminals belong includes any one or more of the following parameters:
an aggregate throughput requirement of the N network slices to which the M terminals belong;
a maximum throughput limit of the N network slices to which the M terminals belong; and
a minimum throughput limit of the N network slices to which the M terminals belong.

Optionally, the aggregate QoS information of the K network slices includes at least one of the following information:
an aggregate throughput requirement of the K network slices;
a maximum throughput limit of the K network slices; or
a minimum throughput limit of the K network slices.

Optionally, the congestion control information includes any one or more of the following parameters:
a network slice service overload instruction;
a network slice service load reduction instruction;
a network slice access level;
a network slice access control configuration category indication;
a network slice access restriction time; and
a network slice access restriction factor.

Optionally, the network slice routing information includes any one or more of the following parameters:
a core network control plane entity identifier; and
a core network user plane entity identifier.

Optionally, the network slice resource isolation requirement includes any one or more of the following indications:
whether architecture sharing is allowed;
whether air interface resource sharing is allowed;
whether protocol stack resource sharing is allowed; and
whether algorithm resource sharing is allowed.

Optionally, the network slice designation or preference requirement includes any one or more of the following parameters:
a designated or preferred frequency;
a designated or preferred frequency band;
a designated or preferred radio access technology;
designated or preferred high- and low-frequency collaboration; and
a designated or preferred quantity of required resources.

Optionally, the network slice topology information includes any one or more of the following indications:
whether relaying is used;
whether coordinated multipoint communication is used; and
whether device-to-device communication is used.

Optionally, the network slice architecture requirement includes any one or more of the following parameters:
a control plane anchor position; and core-network and access-network network element function reconstruction.

Optionally, the network slice resource configuration includes any one or more of the following parameters:

an air interface resource size;

air interface resource time and frequency domain positions;

a generated access preamble sequence; and an access preamble format.

Optionally, the network slice algorithm configuration includes any one or more of the following parameters:

a mobility management algorithm;

a bearer management algorithm;

a paging algorithm; and a security algorithm.

According to a second aspect, an embodiment of this application provides a network slice configuration apparatus. The apparatus includes:

a processing unit, configured to determine network slice configuration information; and a transceiver unit, configured to send the network slice configuration information to a second network device, to instruct the second network device to perform network slice configuration based on the network slice configuration information.

Optionally, the apparatus is a core-network network element, and the second network device is an access-network network element; and the processing unit is specifically configured to:

determine the network slice configuration information based on a received network slice configuration message sent by a third network device, where the third network device is an operation, administration, and management network element.

Optionally, the apparatus is a core-network network element, and the second network device is an access-network network element; and the processing unit is further configured to:

receive a network slice configuration request message sent by the second network device, where the network slice configuration request message is used to request the apparatus to send the network slice configuration information, the network slice configuration request message is sent after the second network device receives a request message sent by a fourth network device, and the fourth network device is a terminal or a target core-network network element.

Optionally, the apparatus is a core-network network element or an operation, administration, and management network element, and the second network device is an access-network network element; and the transceiver unit is further configured to:

receive capability information of the second network device that is sent by the second network device; and the processing unit is specifically configured to:

determine the network slice configuration information based on the capability information of the second network device.

Optionally, the capability information of the second network device includes any one or more of the following information:

identification information of the second network device;

version information of the second network device;

antenna resource information of the second network device;

bandwidth resource information of the second network device;

load information of the second network device;

architecture resource information of the second network device; and user information of the second network device.

Optionally, the apparatus is a core-network network element or an operation, administration, and management network element, and the second network device is an access-network network element; and the transceiver unit is further configured to:

send a network slice management message to the second network device, to instruct the second network device to manage, based on the network slice management message, the network slice configuration information in the second network device.

According to a third aspect, an embodiment of this application provides a network slice configuration apparatus, which may perform any network slice configuration method provided in the first aspect.

In a possible design, a structure of the network slice configuration apparatus includes a processor and a transceiver. The processor is configured to provide support for the network slice configuration apparatus to perform corresponding functions in the foregoing network slice configuration method. The transceiver is coupled to the processor, to support communication between the network slice configuration apparatus and a second network device, and send information or an instruction related to the foregoing network slice configuration method to a terminal. The network slice configuration apparatus may further include a memory. The memory is configured to store a program instruction and is coupled to the processor.

According to a fourth aspect, an embodiment of this application provides a network slice configuration method, including:

receiving, by a second network device, network slice configuration information sent by a first network device; and performing, by the second network device, network slice configuration based on the network slice configuration information.

According to the method provided in this embodiment of this application, after receiving the network slice configuration information, the second network device may perform the network slice configuration based on the network slice configuration information. In this way, a network slice configuration process is perceived on a radio access network side.

Optionally, the first network device is a core-network network element, and the second network device is an access-network network element; and before the receiving, by a second network device, network slice configuration information sent by a first network device, the method further includes:

sending, by the second network device, a network slice configuration request message to the first network device, where the network slice configuration request message is used to request the first network device to send the network slice configuration information.

According to a fifth aspect, an embodiment of this application provides a network slice configuration apparatus. The apparatus includes:

a transceiver unit, configured to receive network slice configuration information sent by a first network device; and a processing unit, configured to perform network slice configuration based on the network slice configuration information.

Optionally, the first network device is a core-network network element, and the apparatus is an access-network network element; and the transceiver unit is further configured to:

send a network slice configuration request message to the first network device, where the network slice configuration request message is used to request the first network device to send the network slice configuration information.

According to a sixth aspect, an embodiment of this application provides a network slice configuration apparatus, which may perform any network slice configuration method provided in the second aspect.

In a possible design, a structure of the network slice configuration apparatus includes a processor and a transceiver. The processor is configured to provide support for the network slice configuration apparatus to perform corresponding functions in the foregoing network slice configuration method. The transceiver is coupled to the processor, to support communication between the network slice configuration apparatus and a second network device, and send information or an instruction related to the foregoing network slice configuration method to a terminal. The network slice configuration apparatus may further include a memory. The memory is configured to store a program instruction and is coupled to the processor.

According to a seventh aspect, an embodiment of this application provides a computer storage medium. The computer storage medium is configured to store a computer software instruction used by the network slice configuration apparatus provided in the second aspect, and includes a program designed to implement the first aspect.

According to an eighth aspect, an embodiment of this application provides a computer storage medium. The computer storage medium is configured to store a computer software instruction used by the network slice configuration apparatus provided in the fourth aspect, and includes a program designed to implement the third aspect.

DESCRIPTION OF EMBODIMENTS

Figure 1:
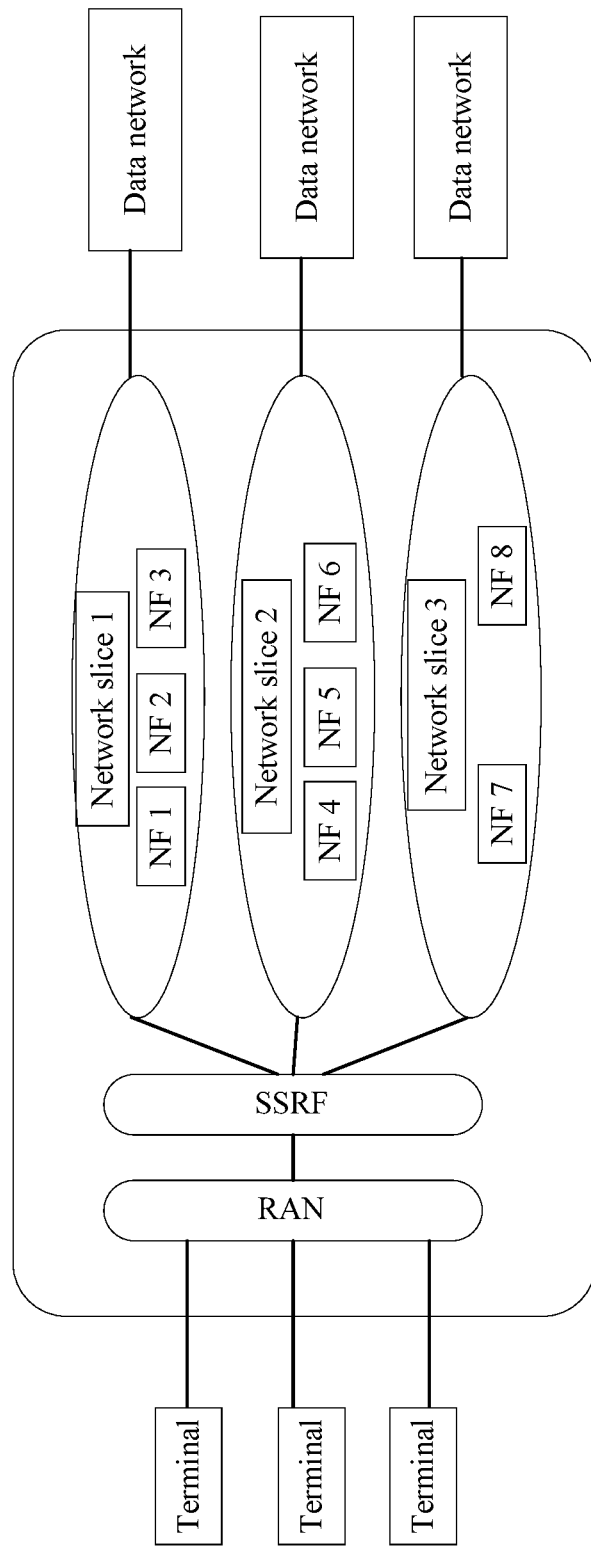
FIG. 1 is a schematic diagram of a possible 5G network architecture according to an embodiment of this application.

Key driving factors for implementing 5G network slicing are a software defined network SDN (software defined network, SDN) and network function virtualization (network function virtualization, NFV). An SDN technology subverts a network element form and decouples a network function and hardware, thereby allowing a vertical system to be subdivided into programmable function modules to form a connectable horizontal network architecture that is applicable to a flexible extended service, and providing a network connection as a service based on a service requirement by using the programmable function, to achieve a purpose of "network as a service". A mobile operator configures and manages hundreds or thousands of network slices by configuring and orchestrating a series of network functions on a control platform in a core network (core network, CN). The network slices relate to a series of configuration and support for end-to-end network elements, including devices such as a user equipment (user equipment, UE) and an access network (radio access network, RAN). The network slices are created in the CN. In addition, on an access network side, the core network and an operation, administration, and management OAM (operation, administration and management, OAM) entity need to configure a network element on the access network side, to perform differentiated processing of services in end-to-end network slicing, thereby ensuring a corresponding service level agreement (service level agreement, SLA) requirement and better supporting the end-to-end network slicing.

Network slicing can implement network quality of service (Quality of Service, QoS) isolation, flexible network management and control, and network efficiency improvement. A network manager can break down end-to-end QoS requirements to map the end-to-end QoS requirements to different sub-network systems and forwarding devices, and create network slices at low costs and a high speed without affecting an existing service. A slice can open up some flexible programmable interfaces to a third-party user, so that the third-party user can design and develop a new network service based on the open interface and rapidly deploy the new network service. This brings considerable economic benefits to an operator, and improves use efficiency of an existing network.

Currently, the 3GPP (the third generation partnership project, 3GPP) classifies typical 5G scenario use cases into the following three types: an enhanced mobile broadband (enhanced mobile broadband, eMBB) service, a massive machine-type connection (massive machine type communication, mMTC) service, and an ultra-reliable and low latency (ultra-reliable and low latency communications, URLLC) service. The eMBB means further improving performance such as user experience based on an existing mobile broadband service scenario. The mMTC is mainly dedicated to an application scenario of the Internet of Things and is applicable to a large-scale, low-power, low-cost, and deep-coverage Internet of Things terminal for providing a network access service. The URLLC is oriented to a service with strict requirements for data transmission reliability and latency, for example, the Internet of Vehicles, industrial control, and other scenarios. The three major scenarios include diversified and differentiated services, and not all of future use cases have relatively high requirements for speed and coverage. Therefore, the 3GPP allows an operator to construct a network slice by using an independent network function set and parameter configuration, to meet requirements of a plurality of virtual operators. In addition, the 3GPP requires that network slices could be dynamically generated based on different market scenarios.

FIG. 1 is a schematic diagram of a possible 5G network architecture. In FIG. 1, a core network may be divided into a plurality of network slice entities. Each network slice entity includes a set of network functions (network function, NF) with specific functions. For example, in FIG. 1, a network slice 1 includes an NF 1, an NF 2, and an NF 3, a network slice 2 includes an NF 4, an NF 5, and an NF 6, and a network slice 3 includes an NF 7 and an NF 8. A RAN is connected to the network slice entities by using a slice selection and routing function (slice selection and routing function, SSRF) module. After accessing the RAN, a terminal selects an appropriate network slice entity by using the SSRF, to access a data network (data network), so that a customized service is provided by using a specific NF and parameter configuration, thereby forming a 5G end-to-end network slice architecture.

In the embodiments of this application, the terminal may be a wireless terminal, for example, may be a mobile phone, a computer, a tablet computer, a personal digital assistant (English: personal digital assistant, PDA for short), a mobile Internet device (English: mobile Internet device, MID for short), a wearable device, an Internet Protocol (English: Internet Protocol, IP for short) phone, a network printer, or an electronic book reader (English: e-book reader).

Figure 2:
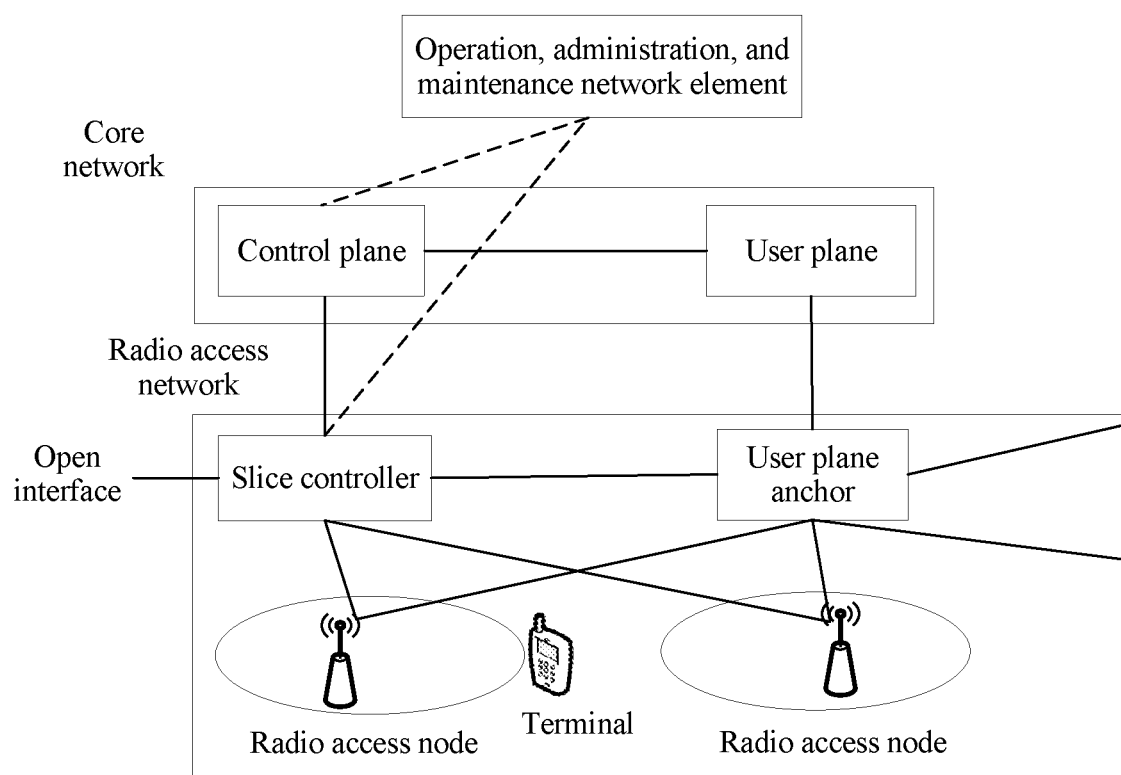
FIG. 2 is a schematic diagram of a system architecture according to an embodiment of this application.

The embodiments of this application may be applied to a mobile communications system such as a 5G communications system or a Long Term Evolution (long term evolution, LTE) system. FIG. 2 is a schematic diagram of a system architecture according to an embodiment of this application. The system architecture shown in FIG. 2 includes an OAM network element, a CN, a RAN, and a terminal. A CN side includes a control plane (control plane, CP) entity and a user plane (user plane, UP) entity. A RAN side includes a slice controller, a user plane anchor, and a radio access node.

OAM network element: The OAM network element is mainly responsible for three major categories of work based on an actual need of a mobile operator: operation, administration, and maintenance. The operation is mainly routine work including analysis, prediction, planning, and configuration performed on a network and a service. The maintenance is mainly routine operation activities such as test box fault management performed on the network and the service. An administration function for a CN network slice is initiated by the OAM network element. The OAM network element is responsible for interacting with a control plane module corresponding to the CN and the RAN, to manage an end-to-end network slice.

CP module on a CN side: may be a mobility management entity (mobility management entity, MME), a CN mobility management anchor, and a CN network slice management entity, and works with a slice controller on the RAN side to perform functions such as connection management, session management, and mobility management for the end-to-end network slice.

Slice controller on the RAN side: is a CP plane module located on the RAN side, and mainly performs, based on network slice information configured by the CP module or the OAM network element in the CN, functions such as RAN-side protocol function management, resource allocation, topology management, inter-slice coordination and management, RAN-side mobility management, system information, paging, and measurement. The slice controller may be used as an independent network element, or deployed as a base station or an internal function module of a RAN-side network element. In a cloud radio access network (cloud RAN, C-RAN) architecture, each protocol layer may be flexibly defined. The slice controller may be further flexibly deployed on a baseband processing unit (baseband unit, BBU) or a remote radio unit (remote radio unit, RRU), or deployed on a BBU and an RRU in a distributed manner. The radio access network may include a relay scenario in which the slice controller may be flexibly deployed on a donor eNodeB (donor eNB, DeNB) or a relay node (relay node, RN).

Figure 3:
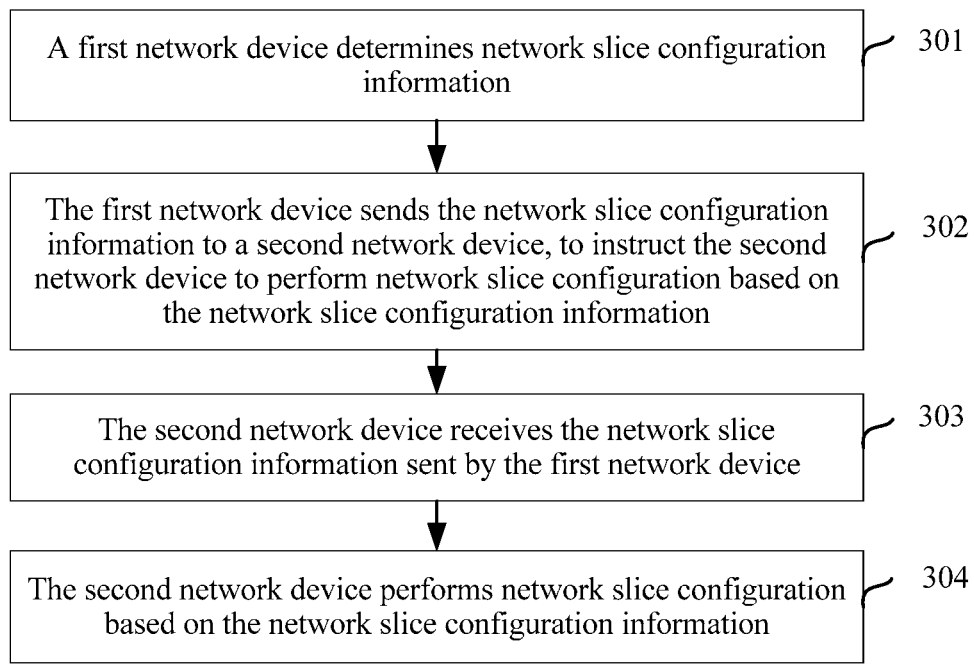
FIG. 3 is a schematic flowchart of a network slice configuration method according to an embodiment of this application.

Based on the foregoing description, FIG. 3 is a schematic flowchart of a network slice configuration method according to an embodiment of this application.

Referring to FIG. 3, the method includes the following steps:

Step 301. A first network device determines network slice configuration information.

Step 302. The first network device sends the network slice configuration information to a second network device, to instruct the second network device to perform network slice configuration based on the network slice configuration information.

Step 303. The second network device receives the network slice configuration information sent by the first network device.

Step 304. The second network device performs the network slice configuration based on the network slice configuration information.

In this embodiment of this application, the network slice configuration information includes any one or more of the following information:

network slice user information;
network slice service management information;
network slice attribute information; and
network slice resource control information.

Specifically, in this embodiment of this application, the network slice user information includes any one or more of the following parameters: network slice identification information, mobile operator information, and user information.

The network slice identification information includes but is not limited to one or more pieces of identification information, and is used to indicate one network slice type or one specific network slice entity.

For example, the mobile operator information may be mobile operator identification information, such as a public land mobile network (public land mobile network, PLMN), a mobile country code (mobile country code, MCC), and a mobile network code (mobile network code, MNC). Certainly, the foregoing are merely examples. Specific mobile operator information may be determined based on an actual situation.

For the user information, a user may be a tenant and a user of a network slice, or may be a person or a legal person. The user information may be a unique identifier used to identify the user, for example, may be an international mobile subscriber identity (International Mobile Subscriber Identification Number, IMSI). Specific user information may be determined based on an actual situation.

In this embodiment of this application, the network slice service management information includes any one or more of the following parameters:

a QoS parameter of each terminal, including but not limited to information about a throughput, a latency, and a packet loss rate of each terminal;

a QoS parameter of each network slice, including but not limited to information about a throughput, a delay, and a packet loss rate of each network slice;

aggregate QoS information of N network slices to which M terminals belong, including but not limited to an aggregate throughput requirement, a maximum throughput limit, and a minimum throughput limit of the N network slices to which the M terminals belong, where M is a natural number, N is a natural number, the aggregate throughput requirement of the N network slices to which the M terminals belong may indicate that for a terminal, an aggregate throughput of the N network slices to which the M terminals belong cannot be higher than or lower than the aggregate throughput requirement, and the maximum throughput limit and the minimum throughput limit of the N network slices to which the M terminals belong may indicate that for a terminal, a maximum throughput of one or more of the N network slices to which the M terminals belong cannot be higher than the maximum throughput limit, and a minimum throughput thereof cannot be lower than the minimum throughput limit;

aggregate QoS information of K network slices, including but not limited to an aggregate throughput requirement, a maximum throughput limit, and a minimum throughput limit of the K network slices, where K is a natural number, the aggregate throughput requirement of the K network slices may indicate that for an access-network network element, an aggregate throughput of the K network slices cannot be higher than or lower than the aggregate throughput requirement, and requirements for the maximum throughput limit and the minimum throughput limit of the K network slices may indicate that for an access-network network element, a maximum throughput of one or more of the K network slices cannot be higher than the maximum throughput limit, and a minimum throughput thereof cannot be lower than the minimum throughput limit;

network slice priority information, used when a plurality of network slices conflict with each other when using resources or making a decision, where a network slice that preferentially uses a resource and other information is determined based on a network slice priority; and congestion control information, including but not limited to: a congestion control parameter of an access-network network element, such as a network slice service overload instruction or a network slice service load reduction instruction, where the network slice service overload instruction is used to instruct the access-network network element to refuse a network connection setup request or a service setup request of a network slice corresponding to a network slice identifier in the congestion control information, and the network slice service load reduction instruction is used to instruct the access-network network element to reduce a signaling load or a data service load of a network slice corresponding to a network slice identifier in the congestion control information to an indicated percentage; an access control parameter of a terminal, such as a network slice access level used by the terminal to determine, before accessing a network and based on an access indication corresponding to the network slice access level, whether access to the network slice is allowed; a network slice access control configuration category indication, used by the terminal to determine, when accessing a network slice and based on an access control configuration category of the network slice, an access control configuration parameter corresponding to the network slice. The access control configuration parameter may include a network slice access restriction time and a network slice access restriction factor. Before accessing a network, the terminal determines, based on the access restriction time, a time that is required before the terminal is allowed to access the network. The network slice access restriction factor is used when the terminal determines a probability of successfully accessing the network slice. For example, the terminal generates a random number, and determines a magnitude relationship between the random number and the network slice access restriction factor. The terminal is allowed to access the network only when the random number is greater than or less than the access restriction factor.

In this embodiment of this application, the network slice attribute information includes any one or more of the following parameters:

network slice identification information, which includes but is not limited to one or more pieces of identification information, and is used to indicate one network slice type or one specific network slice entity;

network slice routing information, which includes but is not limited to a CN control plane entity identifier and a CN user plane entity identifier, and is used in a RAN to route a service flow of a terminal to a CN control plane or a CN control plane entity that is designated by a corresponding network slice;

network slice service area information, specific to distribution of an available geographical area of a corresponding network slice;

network slice target user information, specific to a target user of a corresponding network slice;

network slice coverage information, specific to a coverage area of a corresponding network slice, where the network slice coverage information may be a cell list, a tracking area (tracking area, TA) list, and the like under coverage of the network slice;

network slice capacity and bandwidth information, which is specific to guarantees of a capacity and bandwidth that are required by a corresponding network slice, and can indicate the capacity and the bandwidth that are required by the network slice; and network slice use time period information, specific to a network slice with a specific service time restriction, indicating that a corresponding network slice service is enabled for the network slice in a specified use time period.

In this embodiment of this application, the network slice resource control information includes any one or more of the following parameters:

network slice identification information, which includes but is not limited to one or more pieces of identification information, and is used to indicate one network slice type or one specific network slice entity;

a network slice resource isolation requirement, including but not limited to: whether architecture sharing is allowed, whether air interface resource sharing is allowed, whether protocol stack resource sharing is allowed, whether algorithm resource sharing is allowed, and the like;

a network slice designation or preference requirement, including but not limited to a designated or preferred frequency, frequency band, radio access technology (radio access technology, RAT), high- and low-frequency collaboration, quantity of required resources, and the like;

network slice topology information, including but not limited to: whether relaying is used, whether coordinated multipoint (coordinated multiple point, CoMP) communication is used, and whether device-to-device (device to device, D2D) communication is used;

a network slice architecture requirement, including but not limited to a control plane anchor position, CN and RAN network element function reconstruction, and the like;

network slice configuration, including but not limited to an air interface resource size, air interface resource time and frequency domain positions, a generated access preamble (preamble) sequence, an access preamble format, and the like;

network slice protocol stack configuration, including but not limited to protocol configuration of a radio resource control (radio resource control, RRC) layer, a Packet Data Convergence Protocol (packet data convergence protocol, PDCP) layer, a Radio Link Control (radio link control, RLC) layer, a Medium Access Control (medium access control, MAC) layer, a physical layer, and a non-access stratum (non-access, NAS) layer;

network slice algorithm configuration, including but not limited to a mobility management algorithm, a bearer management algorithm, a paging algorithm, a security algorithm, and the like; and parameter configuration of each function module in a network slice.

In this embodiment of this application, the first network device may be a core-network network element or an operation, administration, and management network element, and the second network device is an access-network network element. The following provides detailed descriptions separately.

In a possible scenario, the first network device may be a core-network network element or an operation, administration, and management network element, and the second network device is an access-network network element.

In this scenario, optionally, before step 301, the second network device may send capability information of the second network device to the first network device, and the first network device receives the capability information of the second network device that is sent by the second network device.

The capability information of the second network device includes any one or more of the following information:

version information of the second network device, including but not limited to information about a version used by or a version supported by the second network device;

antenna resource information of the second network device, including but not limited to an antenna resource available to the second network device, such as a quantity of antennas and a quantity of antenna ports;

bandwidth resource information of the second network device, including but not limited to a bandwidth resource available to the second network device, which includes but is not limited to a quantity of available uplink resource blocks, a quantity of available downlink resource blocks, a time domain position of an available resource block, a frequency domain position of an available resource block, and the like;

load information of the second network device, including but not limited to a current load status of the second network device, which includes but is not limited to a ratio of occupied uplink resources, a ratio of occupied downlink resources, a ratio of available uplink resources, a ratio of available downlink resources, a quantity of connected terminals, and the like;

architecture resource information of the second network device, including but not limited to available energy, power, storage, and the like of the second network device; and user information of the second network device, including but not limited to a user category, a user identity, and the like of the second network device.

In this case, in step 301, the first network device may determine the network slice configuration information based on the capability information of the second network device, and the determined network slice configuration information matches the capability information of the second network device. Specific determining may be performed based on an actual situation. Details are not described herein.

In step 302, the first network device may send the determined network slice configuration information to the second network device by using a configuration message, to be specific, send a configuration message that includes the network slice configuration information to the second network device. It should be noted that the first network device may send the network slice configuration information during creation of a network slice, or may send the network slice configuration information at any time after creation of a network slice. This is not limited in this embodiment of this application.

In step 303, after receiving the network slice configuration information, the second network device may determine whether to accept the network slice configuration information, and return a response message to the first network device. The response message returned by the second network device may be a message indicating that the second network device refuses to accept the network slice configuration information, or may be a message indicating that the second network device agrees to accept the network slice configuration information, or may be another type of feedback message. This is not limited in this embodiment of this application.

Optionally, when the response message returned by the second network device is the message indicating that the second network device refuses to accept the network slice configuration information, a refusal reason is further included, for example, QoS required by a network slice cannot be met, or configuration required by a network slice is not compatible with the capability information of the second network device.

Finally, in step 304, the second network device stores the network slice configuration information, and performs the network slice configuration based on the network slice configuration information.

Optionally, after sending the network slice configuration information to the second network device, the first network device may further send a network slice management message to the second network device, to instruct the second network device to manage, based on the network slice management message, the network slice configuration information in the second network device.

In this embodiment of this application, the network slice management message includes any one or more of the following information:

a network slice activation command, used to activate network slice configuration information configured in the second network device;

a network slice deactivation command, used to deactivate network slice configuration information configured in the second network device;

a network slice enabling command, used to enable network slice configuration information configured in the second network device;

a network slice disabling command, used to disable network slice configuration information configured in the second network device;

network slice reconfiguration information, used to reconfigure network slice configuration information configured in the second network device; and a network slice identifier.

Optionally, after receiving the network slice management message, the second network device may determine whether to accept the network slice management message, and return a network slice management response message to the first network device. The network slice management response message returned by the second network device may be refusing to accept the network slice management message, or may be agreeing to accept the network slice management message, or may be another type of feedback message. This is not limited in this embodiment of this application.

Optionally, when the network slice management response message returned by the second network device is the message indicating that the second network device refuses to accept the network slice management message, a refusal reason is further included, for example, QoS required by a network slice cannot be met, or configuration required by a network slice is not compatible with the capability information of the second network device.

In a possible scenario, the first network device is a core-network network element, and the second network device is an access-network network element.

In this scenario, optionally, before step 301, the first network device may receive a network slice configuration request message sent by the second network device. The network slice configuration request message is used to request the first network device to send the network slice configuration information. The network slice configuration request message may be sent after the second network device receives a request message sent by a fourth network device, and the request message is used to instruct the second network device to perform the network slice configuration. The fourth network device is a terminal or a target core-network network element. For example, in this case, the first network device may be an NF, and the fourth network device may be an SSRF.

Optionally, the network slice configuration request message sent by the second network device may be information such as network slice identification information or network slice type information. Correspondingly, the request message sent by the terminal may be information such as network slice identification information or network slice type information.

In step 301, the first network device determines the network slice configuration information based on a received network slice configuration message sent by a third network device. The network slice configuration message includes the network slice configuration information. The third network device is an operation, administration, and management network element.

Optionally, after receiving the network slice configuration message sent by the third network device, the first network device may return a network slice configuration response message to the third network device. The network slice configuration response message returned by the first network device may be a message indicating that the first network device refuses to accept the network slice configuration information, or may be a message indicating that the first network device agrees to accept the network slice configuration information, or may be another type of feedback message. This is not limited in this embodiment of this application.

Optionally, when the network slice configuration response message returned by the first network device is the message indicating that the first network device refuses to accept the network slice configuration information, a refusal reason is further included, for example, QoS required by a network slice cannot be met, or configuration required by a network slice is not compatible with the capability information of the second network device.

In step 302, the first network device sends the determined network slice configuration information to the second network device. For other content of this step, refer to the foregoing description. Details are not described herein.

In step 303, after receiving the network slice configuration information, the second network device may further send a response message to the first network device. For details, refer to the foregoing description. Details are not described herein.

Optionally, after receiving the network slice configuration information, the second network device may further send a network slice configuration notification message that includes the network slice configuration information to the terminal, to instruct the terminal to store the network slice configuration information.

The foregoing process is described below by using specific embodiments.

Figure 4:
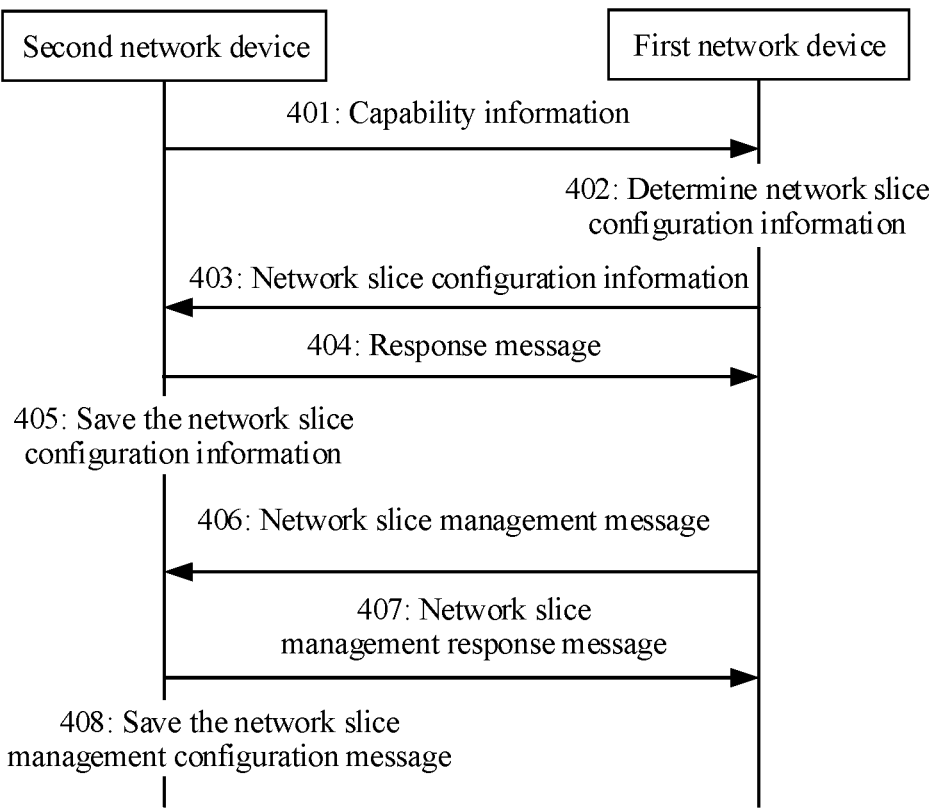
FIG. 4 is a schematic flowchart of network slice configuration according to an embodiment of this application.

FIG. 4 is a schematic flowchart of network slice configuration according to an embodiment of this application.

In FIG. 4, a first network device is a core-network network element or an operation, administration, and management network element, and a second network device is an access-network network element.

Step 401: The second network device sends capability information of the second network device to the first network device.

Step 402. The first network device determines network slice configuration information.

The first network device may determine the network slice configuration information based on the capability information of the second network device.

Step 403: The first network device sends the determined network slice configuration information to the second network device.

Step 404: The second network device returns a response message to the first network device.

The response message returned by the second network device may be a message indicating that the second network device refuses to accept the network slice configuration information, or may be a message indicating that the second network device agrees to accept the network slice configuration information, or may be another type of feedback message.

Step 405. The second network device stores the network slice configuration information.

Step 406. The first network device sends a network slice management message to the second network device.

Step 407: The second network device returns a network slice management response message to the first network device.

The network slice management response message returned by the second network device may be refusing to accept the network slice management message, or may be agreeing to accept the network slice management message, or may be another type of feedback message. This is not limited in this embodiment of this application.

Step 408. The second network device stores the network slice management message.

Figure 5:
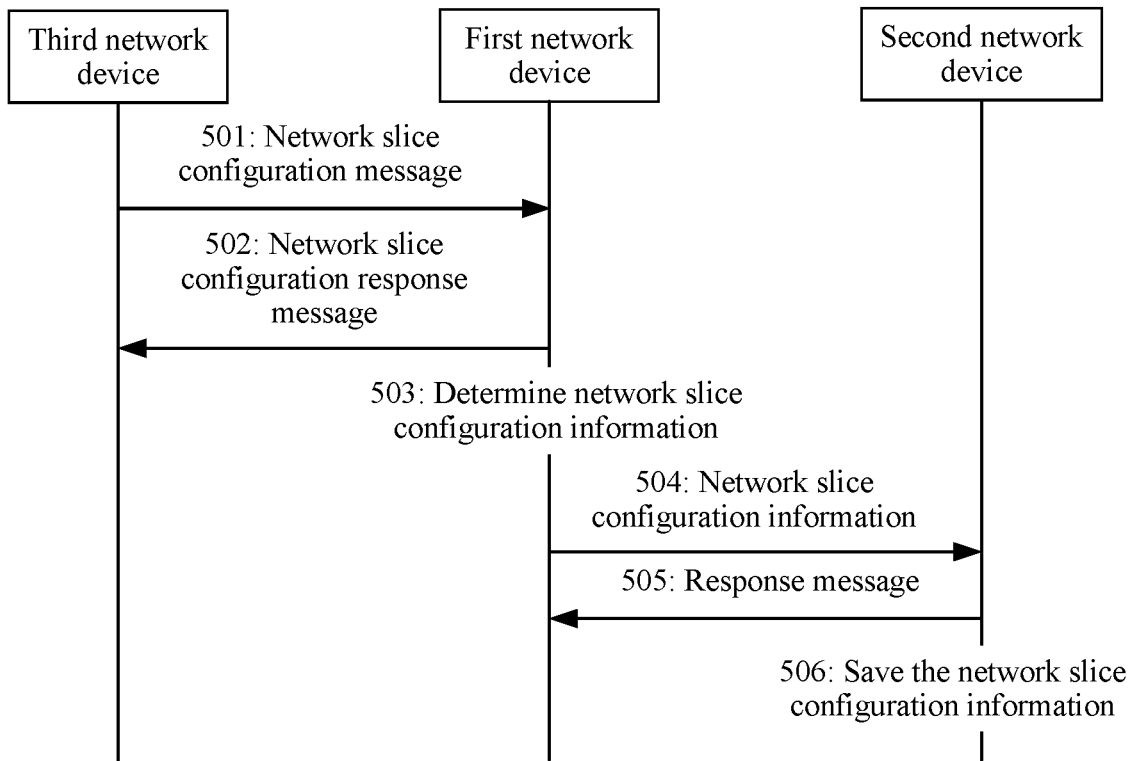
FIG. 5 is a schematic flowchart of network slice configuration according to an embodiment of this application.

FIG. 5 is a schematic flowchart of network slice configuration according to an embodiment of this application.

In FIG. 5, a first network device is a core-network network element, a second network device is an access-network network element, and a third network device is an operation, administration, and management network element.

Step 501. The third network device sends a network slice configuration message to the first network device.

The network slice configuration message includes network slice configuration information.

Step 502: The first network device returns a network slice configuration response message to the third network device.

The network slice configuration response message may be a message indicating that the first network device refuses to accept the network slice configuration information, or may be a message indicating that the first network device agrees to accept the network slice configuration information, or may be another type of feedback message. This is not limited in this embodiment of this application.

Step 503. The first network device determines the network slice configuration information based on the received network slice configuration message.

Step 504: The first network device sends the determined network slice configuration information to the second network device.

Step 505: The second network device returns a response message to the first network device.

The response message returned by the second network device may be a message indicating that the second network device refuses to accept the network slice configuration information, or may be a message indicating that the second network device agrees to accept the network slice configuration information, or may be another type of feedback message.

Step 506. The second network device stores the network slice configuration information.

Figure 6:
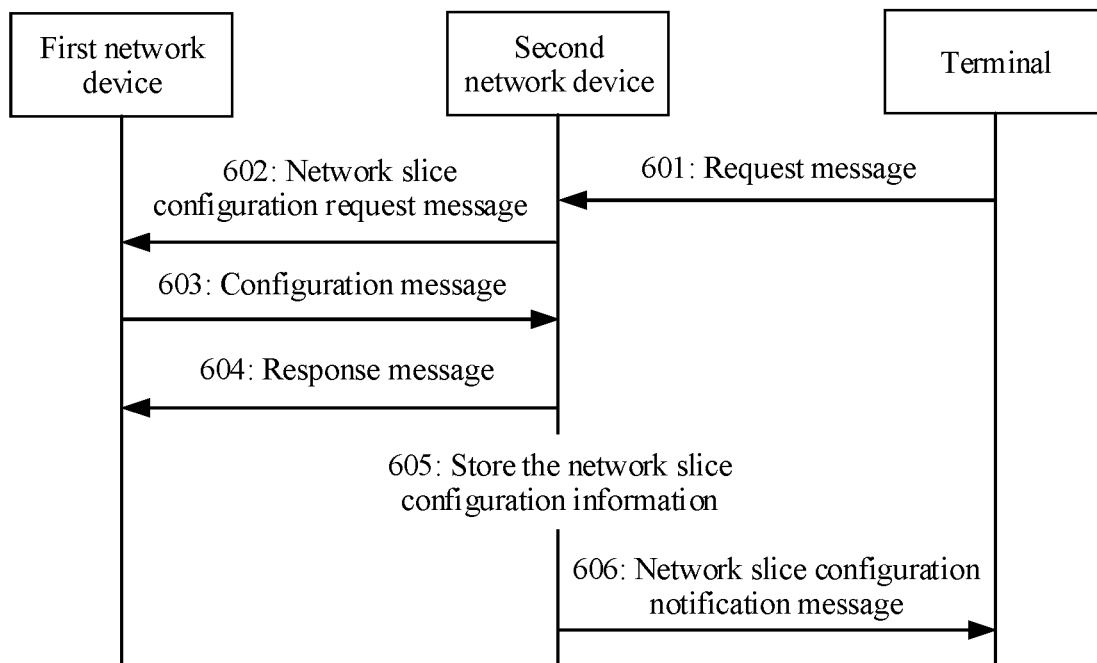
FIG. 6 is a schematic flowchart of network slice configuration according to an embodiment of this application.

FIG. 6 is a schematic flowchart of network slice configuration according to an embodiment of this application.

In FIG. 6, the first network device is a core-network network element, and the second network device is an access-network network element.

Step 601. A terminal sends a request message to the second network device.

The request message is used to instruct the second network device to perform network slice configuration. The request message may include information such as network slice identification information and network slice type information.

Step 602. The second network device sends a network slice configuration request message to the first network device.

The network slice configuration request message may include the information such as the network slice identification information and the network slice type information.

Step 603. The first network device sends a configuration message to the second network device, where the configuration message includes the network slice configuration information.

Step 604: The second network device returns a response message to the first network device.

The response message returned by the second network device may be a message indicating that the second network device refuses to accept the network slice configuration information, or may be a message indicating that the second network device agrees to accept the network slice configuration information, or may be another type of feedback message.

Step 605. The second network device stores the network slice configuration information.

Step 606. The second network device sends a network slice configuration notification message to the terminal. The network slice configuration notification message includes the network slice configuration information. The terminal stores the network slice configuration information, such as network slice attribute information, network slice service management information, and network slice resource control information. The terminal may perform protocol stack configuration, algorithm configuration, and the like based on the network slice configuration information. The terminal may store access control parameter information or the like of the terminal based on congestion control information in the service management information.

Figure 7:
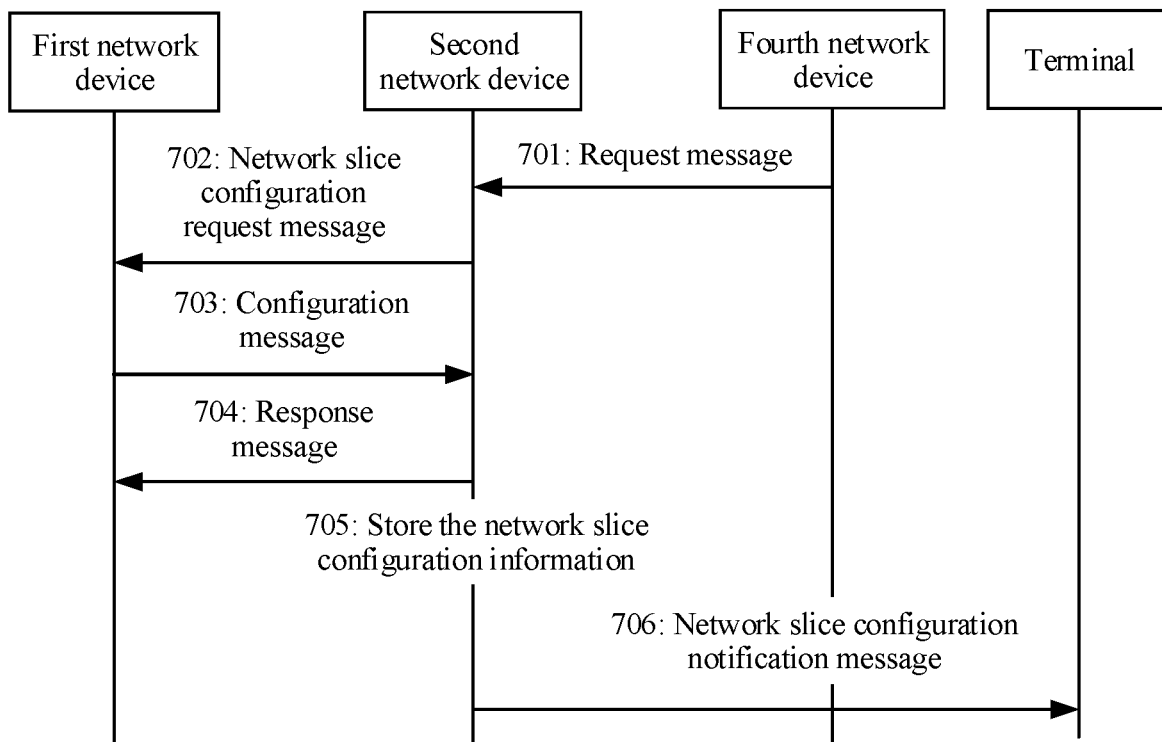
FIG. 7 is a schematic flowchart of network slice configuration according to an embodiment of this application.

FIG. 7 is a schematic flowchart of network slice configuration according to an embodiment of this application.

In FIG. 7, a first network device is a core-network network element, for example, an NF; a second network device is an access-network network element; and a fourth network device is a target core-network network element, for example, an SSRF.

Step 701. The fourth network device sends a request message to the second network device.

The request message is used to instruct the second network device to perform network slice configuration. The request message may include information such as network slice identification information and network slice type information.

Step 702. The second network device sends a network slice configuration request message to the first network device.

The network slice configuration request message may include the information such as the network slice identification information and the network slice type information.

Step 703. The first network device sends a configuration message to the second network device, where the configuration message includes the network slice configuration information.

Step 704: The second network device returns a response message to the first network device.

The response message returned by the second network device may be a message indicating that the second network device refuses to accept the network slice configuration information, or may be a message indicating that the second network device agrees to accept the network slice configuration information, or may be another type of feedback message.

Step 705. The second network device stores the network slice configuration information.

Step 706. The second network device sends a network slice configuration notification message to a terminal. The network slice configuration notification message includes the network slice configuration information. The terminal stores the network slice configuration information, such as network slice attribute information, network slice service management information, and network slice resource control information. The terminal may perform protocol stack configuration, algorithm configuration, and the like based on the network slice configuration information. The terminal may store access control parameter information or the like of the terminal based on congestion control information in the service management information.

Based on a same technical concept, an embodiment of this application further provides a network slice configuration apparatus. The apparatus can perform the foregoing method embodiments.

Figure 8:
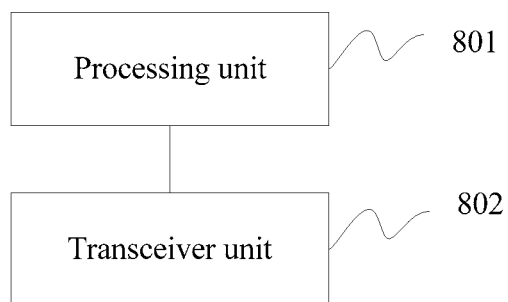
FIG. 8 is a schematic structural diagram of a network slice configuration apparatus according to an embodiment of this application.

FIG. 8 is a schematic structural diagram of a network slice configuration apparatus according to an embodiment of this application.

Referring to FIG. 8, the apparatus includes:

a processing unit 801, configured to determine network slice configuration information; and a transceiver unit 802, configured to send the network slice configuration information to a second network device, to instruct the second network device to perform network slice configuration based on the network slice configuration information.

Optionally, the apparatus is a core-network network element, and the second network device is an access-network network element; and the processing unit 801 is specifically configured to:

determine the network slice configuration information based on a received network slice configuration message sent by a third network device, where the third network device is an operation, administration, and management network element.

Optionally, the apparatus is a core-network network element, and the second network device is an access-network network element; and the processing unit 801 is further configured to:

receive a network slice configuration request message sent by the second network device, where the network slice configuration request message is used to request the apparatus to send the network slice configuration information, the network slice configuration request message is sent after the second network device receives a request message sent by a fourth network device, and the fourth network device is a terminal or a target core-network network element.

Optionally, the apparatus is a core-network network element or an operation, administration, and management network element, and the second network device is an access-network network element; and the transceiver unit 802 is further configured to:

receive capability information of the second network device that is sent by the second network device; and the processing unit 801 is specifically configured to:

determine the network slice configuration information based on the capability information of the second network device.

Optionally, the capability information of the second network device includes any one or more of the following information:

identification information of the second network device;
version information of the second network device;
antenna resource information of the second network device;
bandwidth resource information of the second network device;
load information of the second network device;
architecture resource information of the second network device; and
user information of the second network device.

Optionally, the apparatus is a core-network network element or an operation, administration, and management network element, and the second network device is an access-network network element; and the transceiver unit 802 is further configured to:

send a network slice management message to the second network device, to instruct the second network device to manage, based on the network slice management message, the network slice configuration information in the second network device.

Optionally, the network slice management message includes any one or more of the following information:

a network slice activation command;
a network slice deactivation command;
a network slice enabling command;
a network slice disabling command;
network slice reconfiguration information; and
a network slice identifier.

Optionally, the transceiver unit 802 is further configured to:

receive a response message sent by the second network device, where the response message is used to indicate that the second network device refuses to accept the network slice configuration information, and the response message includes a refusal reason.

Optionally, the network slice configuration information includes any one or more of the following information:

network slice user information;
network slice service management information;
network slice attribute information; and
network slice resource control information.

Optionally, the network slice user information includes any one or more of the following parameters:

network slice identification information;
mobile operator information; and
user information.

Optionally, the network slice service management information includes any one or more of the following parameters:

network slice identification information;
a quality of service QoS parameter of each terminal;
a QoS parameter of each network slice;
aggregate QoS information of N network slices to which M terminals belong, where M is a natural number and N is a natural number;
aggregate QoS information of K network slices, where K is a natural number;
network slice priority information; and
congestion control information.

Optionally, the network slice attribute information includes any one or more of the following parameters:

network slice identification information;
network slice routing information;
network slice service area information;
network slice target user information;
network slice coverage information;
network slice capacity and bandwidth information; and
network slice service time period information.

Optionally, the network slice resource control information includes any one or more of the following parameters:

network slice identification information;
a network slice resource isolation requirement;
a network slice designation or preference requirement;
network slice topology information;
a network slice architecture requirement;
network slice resource configuration;
network slice protocol stack configuration;
network slice algorithm configuration; and
parameter configuration of each function module in a network slice.

Optionally, the aggregate QoS information of the N network slices to which the M terminals belong includes any one or more of the following parameters:

an aggregate throughput requirement of the N network slices to which the M terminals belong;
a maximum throughput limit of the N network slices to which the M terminals belong; and
a minimum throughput limit of the N network slices to which the M terminals belong.

Optionally, the aggregate QoS information of the K network slices includes at least one of the following information:

an aggregate throughput requirement of the K network slices;
a maximum throughput limit of the K network slices; or
a minimum throughput limit of the K network slices.

Optionally, the congestion control information includes any one or more of the following parameters:

a network slice service overload instruction;

a network slice service load reduction instruction;
a network slice access level;
a network slice access control configuration category indication;
a network slice access restriction time; and
a network slice access restriction factor.

Optionally, the network slice routing information includes any one or more of the following parameters:
a core network control plane entity identifier; and
a core network user plane entity identifier.

For other content about the apparatus shown in FIG. 8, refer to the description related to FIG. 3. Details are not described herein again.

Based on a same technical concept, an embodiment of this application further provides a network slice configuration apparatus. The apparatus can perform the foregoing method embodiments.

Figure 9:
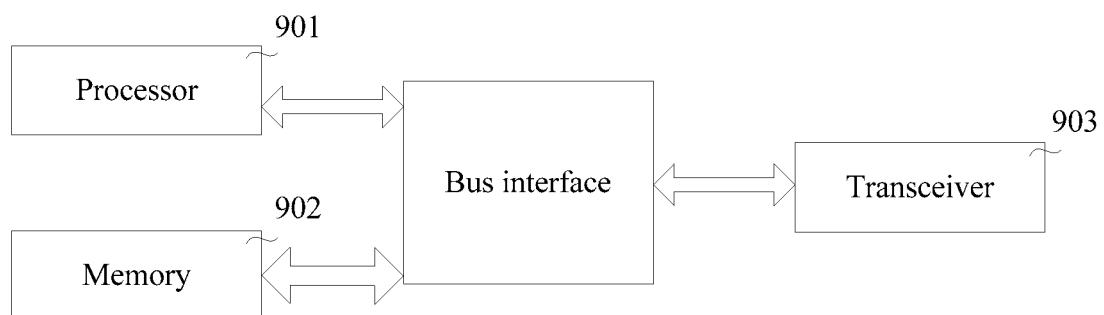
FIG. 9 is a schematic structural diagram of a network slice configuration apparatus according to an embodiment of this application.

FIG. 9 is a schematic structural diagram of a network slice configuration apparatus according to an embodiment of this application.

Referring to FIG. 9, the apparatus includes a processor 901, a memory 902, and a transceiver 903.

The memory 902 is configured to store a program instruction, and is coupled to the processor 901. The transceiver 903 is coupled to the processor 901, to support communication between the network slice configuration apparatus and a second network device.

The transceiver 903 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor 901 may be a central processing unit (English: central processing unit, CPU for short), a network processor (English: network processor, NP for short), or a combination of a CPU and an NP. The processor 901 may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field-programmable gate array (English: field-programmable gate array, FPGA for short), generic array logic (English: generic array logic, GAL for short), or any combination thereof. The memory 902 may include a volatile memory (English: volatile memory), for example, a random-access memory (English: random-access memory, RAM for short), or the memory 902 may include a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short), or the memory 902 may include a combination of the foregoing types of memories.

The processor 901 is configured to determine network slice configuration information.

The transceiver 903 is configured to send the network slice configuration information to the second network device, to instruct the second network device to perform network slice configuration based on the network slice configuration information.

Optionally, the apparatus is a core-network network element, and the second network device is an access-network network element; and
the processor 901 is specifically configured to:
determine the network slice configuration information based on a received network slice configuration message sent by a third network device, where
the third network device is an operation, administration, and management network element.

Optionally, the apparatus is a core-network network element, and the second network device is an access-network network element; and
the processor 901 is further configured to:
receive a network slice configuration request message sent by the second network device, where the network slice configuration request message is used to request the apparatus to send the network slice configuration information, the network slice configuration request message is sent after the second network device receives a request message sent by a fourth network device, and the fourth network device is a terminal or a target core-network network element.

For other content about the apparatus shown in FIG. 9, refer to the description related to FIG. 3. Details are not described herein again.

Based on a same technical concept, an embodiment of this application further provides a network slice configuration apparatus. The apparatus can perform the foregoing method embodiments.

Figure 10:
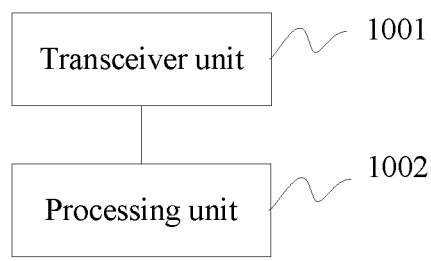
FIG. 10 is a schematic structural diagram of a network slice configuration apparatus according to an embodiment of this application.

FIG. 10 is a schematic structural diagram of a network slice configuration apparatus according to an embodiment of this application.

Referring to FIG. 10, the apparatus includes:
a transceiver unit 1001, configured to receive network slice configuration information sent by a first network device; and
a processing unit 1002, configured to perform network slice configuration based on the network slice configuration information.

Optionally, the first network device is a core-network network element, and the apparatus is an access-network network element; and
the transceiver unit 1001 is further configured to:
send a network slice configuration request message to the first network device, where the network slice configuration request message is used to request the first network device to send the network slice configuration information.

For other content about the apparatus shown in FIG. 10, refer to the description related to FIG. 3. Details are not described herein again.

Based on a same technical concept, an embodiment of this application further provides a network slice configuration apparatus. The apparatus can perform the foregoing method embodiments.

Figure 11:
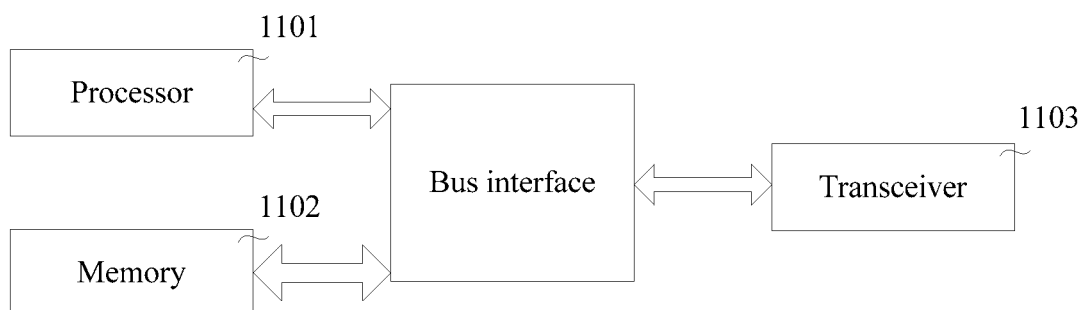
FIG. 11 is a schematic structural diagram of a network slice configuration apparatus according to an embodiment of this application.

FIG. 11 is a schematic structural diagram of a network slice configuration apparatus according to an embodiment of this application.

Referring to FIG. 11, the apparatus includes a processor 1101, a memory 1102, and a transceiver 1103.

The memory 1102 is configured to store a program instruction, and is coupled to the processor 1101. The transceiver 1103 is coupled to the processor 1101, to support communication between the network slice configuration apparatus and a first network device.

The transceiver 1103 is configured to receive network slice configuration information sent by the first network device.

The processor 1101 is configured to perform network slice configuration based on the network slice configuration information.

Optionally, the first network device is a core-network network element, and the apparatus is an access-network network element; and the transceiver 1103 is further configured to:

send a network slice configuration request message to the first network device, where the network slice configuration request message is used to request the first network device to send the network slice configuration information.

For other content about the apparatus shown in FIG. 11, refer to the description related to FIG. 3. Details are not described herein again.

FIG. 11 may further include a bus interface. The bus interface may include any quantity of interconnected buses and bridges. Specifically, one or more processors represented by the processor and various memory circuits represented by the memory are linked together. The bus interface may further link various other circuits such as a peripheral device, a voltage regulator, and a power management circuit. These are all known in the art, and therefore are not further described in this specification. The bus interface provides an interface. The transceiver provides a unit configured to communicate with various other devices on a transmission medium. The processor is responsible for managing a bus architecture and general processing. The memory may store data to be used by the processor when the processor performs an operation.

This application further provides the following embodiments. For example:

Embodiment 1

A network slice configuration method includes: determining, by a first network device, network slice configuration information; and sending, by the first network device, the network slice configuration information to a second network device, to instruct the second network device to perform network slice configuration based on the network slice configuration information.

Embodiment 2

Based on the method in Embodiment 1, the first network device is a core network element, and the second network device is an access network element. The determining, by a first network device, network slice configuration information includes: determining, by the first network device, the network slice configuration information based on a received network slice configuration message sent by a third network device. The third network device is an operation, administration, and management network element.

Embodiment 3

Based on the method in Embodiment 1, the first network device is a core network element, and the second network device is an access network element. Before the determining, by a first network device, network slice configuration information, the method further includes: receiving, by the first network device, a network slice configuration request message sent by the second network device. The network slice configuration request message is used to request the first network device to send the network slice configuration information, the network slice configuration request message is sent after the second network device receives a request message sent by a fourth network device, and the fourth network device is a terminal or a target core network element.

Embodiment 4

Based on the method in Embodiment 1, the first network device is a core network element or an operation and management network element, and the second network device is an access network element. Before the determining, by a first network device, network slice configuration information, the method further includes: receiving, by the first network device, capability information of the second network device that is sent by the second network device. The determining, by a first network device, network slice configuration information includes: determining, by the first network device, the network slice configuration information based on the capability information of the second network device.

Embodiment 5

Based on the method in Embodiment 4, the capability information of the second network device includes any one or more of the following information:

identification information of the second network device;
version information of the second network device;
antenna resource information of the second network device;
bandwidth resource information of the second network device;
load information of the second network device;
architecture resource information of the second network device; and
user information of the second network device.

Embodiment 6

Based on the method in Embodiment 1, the first network device is a core network element or an operation and management network element, and the second network device is an access network element. After the sending, by the first network device, the network slice configuration information to a second network device, the method further includes: sending, by the first network device, a network slice management message to the second network device, to instruct the second network device to manage the network slice configuration information in the second network device based on the network slice management message.

Embodiment 7

Based on the method in Embodiment 6, the network slice management message includes any one or more of the following information:

a network slice activation command;
a network slice deactivation command;
a network slice enabling command;
a network slice disabling command;
network slice reconfiguration information; and
a network slice identifier.

Embodiment 8

Based on the method in any one of Embodiments 1 to 7, after the sending, by the first network device, the network slice configuration information to a second network device, the method further includes: receiving, by the first network device, a response message sent by the second network device. The response message is used to indicate that the second network device refuses to accept the network slice configuration information, and the response message includes a refusal reason.

Embodiment 9

Based on the method in any one of Embodiments 1 to 8, the network slice configuration information includes any one or more of the following information:
network slice user information;
network slice service management information;
network slice attribute information; and
network slice resource control information.

Embodiment 10

Based on the method in Embodiment 9, the network slice service management information includes any one or more of the following parameters:
network slice identification information;
a quality of service QoS parameter of each terminal;
a QoS parameter of each network slice;
aggregate QoS information of N network slices to which M terminals belong, where M is a natural number and N is a natural number;
aggregate QoS information of K network slices, where K is a natural number;
network slice priority information; and
congestion control information.

Embodiment 11

Based on the method in Embodiment 9, the network slice attribute information includes any one or more of the following parameters:
network slice identification information;
network slice routing information;
network slice service area information;
network slice target user information;
network slice coverage information;
network slice capacity and bandwidth information; and
network slice service time period information.

Embodiment 12

Based on the method in Embodiment 10, the aggregate QoS information of the N network slices to which the M terminals belong includes any one or more of the following parameters:
an aggregate throughput requirement of the N network slices to which the M terminals belong;
a maximum throughput limit of the N network slices to which the M terminals belong; and
a minimum throughput limit of the N network slices to which the M terminals belong.

Embodiment 13

Based on the method in Embodiment 10, the aggregate QoS information of the K network slices includes at least one of the following information:
an aggregate throughput requirement of the K network slices;
a maximum throughput limit of the K network slices; or
a minimum throughput limit of the K network slices.

Embodiment 14

Based on the method in Embodiment 10, the congestion control information includes any one or more of the following parameters:
a network slice service overload instruction;
a network slice service load reduction instruction;
a network slice access level;
a network slice access control configuration category indication;
a network slice access restriction time; and
a network slice access restriction factor.

Embodiment 15

A network slice configuration apparatus includes a processor, a memory, and a transceiver, where the memory is configured to store a program instruction, and is coupled to the processor, and the transceiver is coupled to the processor, to support communication between the network slice configuration apparatus and a second network device; and
the processor is configured to perform the program instruction stored in the memory, to provide support for the network slice configuration apparatus to perform the network slice configuration method according to any one of the foregoing embodiments 1 to 14.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are to be construed as to cover the preferred embodiments and all changes and modifications falling within the scope of this application.

Obviously, persons skilled in the art can make various modifications and variations to this application without departing from the scope of this application. This application is intended to cover these modifications and variations provided that these modifications and variations in this application fall within the protection scope of the claims of this application.

What is claimed is:

1. A method for network slice configuration, comprising:
receiving, by an access-network network element, a request message from a terminal, wherein the request message comprises network slice identification information of a network slice;
sending, by the access-network network element, a network slice configuration request message to a core-network network element, wherein the network slice configuration request message carries the network slice identification information;
receiving, by the access-network network element, a configuration message from the core-network network element, wherein the configuration message carries network slice configuration information;
sending, by the access-network network element, a response message to the core-network network element;
storing, by the access-network network element, the network slice configuration information; and
sending, by the access-network network element, a network slice configuration notification message to the terminal, wherein the network slice configuration notification message carries the network slice configuration information;
wherein the network slice configuration information comprises: the network slice identification information of the network slice and a quality of service (QoS) parameter of the network slice.

2. The method for network slice configuration according to claim 1, wherein the network slice configuration information further comprises one or both of: a network slice priority information and a congestion control information, wherein the network slice priority information is used for the network slice to determine a preferentially use to a resource when a plurality of network slices conflict with each other when using resources, and wherein the congestion control information comprises one or both of a network slice service overload instruction and a network slice service load reduction instruction.

3. The method for network slice configuration according to claim 2, further comprising:
sending, by the access-network network element, the congestion control information to the terminal.

4. A method for network slice configuration, comprising:
sending, by a terminal, a request message to an access-network network element, wherein the request message comprises network slice identification information of a network slice, wherein the-network slice identification information is carried in a network slice configuration request message and sent to a core-network network element, and wherein the network slice configuration request message is an interface message between the access-network network element and the core-network network element; and receiving, by the terminal, a network slice configuration notification message from the access-network network element, wherein the network slice configuration notification message carries network slice configuration information, and wherein the network slice configuration information comprises: the network slice identification information of the network slice and a quality of service (QoS) parameter of the network slice.

5. The method for network slice configuration according to claim 4, wherein the network slice configuration information further comprises one or both of: a network slice priority information and a congestion control information, wherein the network slice priority information is used for the network slice to determine a preferentially use to a resource when a plurality of network slices conflict with each other when using resources, and wherein the congestion control information comprises one or both of a network slice service overload instruction and a network slice service load reduction instruction.

6. The method for network slice configuration according to claim 5, further comprising:
receiving, by the terminal, the congestion control information from the access-network network element.

7. An apparatus for network slice configuration, comprising:
at least one processor; and
a non-transitory memory storing instructions that, when executed by the at least one processor, cause the apparatus to:
receive a request message from a terminal, wherein the request message comprises network slice identification information of a network slice;
send a network slice configuration request message to a core-network network element, wherein the network slice configuration request message carries the network slice identification information;
receive a configuration message from the core-network network element, wherein the configuration message carries network slice configuration information;
send a response message to the core-network network element;
store the network slice configuration information; and
send a network slice configuration notification message to the terminal, wherein the network slice configuration notification message carries the network slice configuration information;
wherein the network slice configuration information comprises: the network slice identification information of the network slice and a quality of service (QoS) parameter of the network slice.

8. The apparatus according to claim 7, wherein the network slice configuration information further comprises one or both of: a network slice priority information and a congestion control information, wherein the network slice priority information is used for the network slice to determine a preferentially use to a resource when a plurality of network slices conflict with each other when using resources, and wherein the congestion control information comprises one or both of a network slice service overload instruction and a network slice service load reduction instruction.

9. The apparatus according to claim 8, wherein the instructions, executed by the at least one processor, cause the apparatus to send the congestion control information to the terminal.

10. An apparatus for network slice configuration, comprising:

at least one processor; and a non-transitory memory storing instructions that, when executed by the at least one processor, cause the apparatus to:

send a request message to an access-network network element, wherein the request message comprises network slice identification information of a network slice, wherein the network slice identification information is carried in a network slice configuration request message and sent to a core-network network element, and wherein the network slice configuration request message is an interface message between the access-network network element and the core-network network element; and receive a network slice configuration notification message from the access-network network element, wherein the network slice configuration notification message carries network slice configuration information, wherein the network slice configuration information comprises: the network slice identification information of the network slice and a quality of service (QoS) parameter of the network slice.

11. The apparatus according to claim 10, wherein the network slice configuration information further comprises one or both of: a network slice priority information and a congestion control information, wherein the network slice priority information is used for the network slice to determine a preferentially use to a resource when a plurality of network slices conflict with each other when using resources, and wherein the congestion control information comprises one or both of a network slice service overload instruction and a network slice service load reduction instruction.

12. The apparatus according to claim 11, wherein the instructions, executed by the at least one processor, cause the apparatus to receive the congestion control information from the access-network network element.

13. An apparatus for network slice configuration, comprising:

at least one processor; and a non-transitory memory storing instructions that, when executed by the at least one processor, cause the apparatus to:

receive a network slice configuration request message from an access-network network element, wherein the network slice configuration request message carries network slice identification information of a network slice, and wherein the network slice identification information is carried in a request message sent by a terminal to the access-network network element;

send a configuration message to the access-network network element, wherein the configuration message carries network slice configuration information; and receive a response message from the access-network network element, wherein:

the network slice configuration information is carried in a network slice configuration notification message sent to the terminal by the access-network network element;

the network slice configuration information comprises: the network slice identification information of the network slice and a quality of service (QoS) parameter of the network slice.

14. The apparatus according to claim 13, wherein the network slice configuration information further comprises one or both of: a network slice priority information and a congestion control information, wherein the network slice priority information is used for the network slice to determine a preferentially use to a resource when a plurality of network slices conflict with each other when using resources, and wherein the congestion control information comprises one or both of a network slice service overload instruction and a network slice service load reduction instruction.

15. The apparatus according to claim 14, wherein the congestion control information is sent to the terminal.

\* \* \* \* \*